(12) United States Patent
Tanaka et al.

(10) Patent No.: US 8,342,997 B2
(45) Date of Patent: Jan. 1, 2013

(54) HYDRAULIC CONTROL DEVICE FOR AUTOMATIC TRANSMISSION

(75) Inventors: Hiroshi Tanaka, Hekinan (JP); Teruaki Naito, Nagoya (JP)

(73) Assignee: Aisin AW Co., Ltd., Aichi-ken (JP)

( * ) Notice: Subject to any disclaimer, the term of this patent is extended or adjusted under 35 U.S.C. 154(b) by 451 days.

(21) Appl. No.: 12/695,593

(22) Filed: Jan. 28, 2010

(65) Prior Publication Data

US 2010/0234176 A1 Sep. 16, 2010

(30) Foreign Application Priority Data

Mar. 12, 2009 (JP) ................................ 2009-059622

(51) Int. Cl.
*F16H 47/08* (2006.01)
*F16H 61/48* (2006.01)
(52) U.S. Cl. .......................................... 475/65; 477/57
(58) Field of Classification Search ............. 475/61, 475/64, 65, 159; 477/53, 57, 67; 184/6.12, 184/6.22
See application file for complete search history.

(56) References Cited

U.S. PATENT DOCUMENTS

| | | | |
|---|---|---|---|
| 3,814,221 A * | 6/1974 | Fuehrer | 192/3.34 |
| 5,339,935 A * | 8/1994 | Ishii et al. | 192/3.3 |
| 6,045,480 A | 4/2000 | Sakai et al. | |
| 2001/0004621 A1 * | 6/2001 | Suzuki et al. | 477/168 |
| 2004/0188180 A1 * | 9/2004 | Wheeler | 184/6.12 |
| 2007/0186981 A1 | 8/2007 | Fukushima et al. | |

FOREIGN PATENT DOCUMENTS

| | | |
|---|---|---|
| JP | 08-135772 A | 5/1996 |
| JP | 11-030317 A | 2/1999 |
| JP | 2007-211968 A | 8/2007 |
| JP | 2009-150528 A | 7/2009 |

* cited by examiner

*Primary Examiner* — Roger Pang
(74) *Attorney, Agent, or Firm* — Sughrue Mion, PLLC

(57) ABSTRACT

A hydraulic control device for an automatic transmission that prevents the introduction of foreign materials from a starter into the lubricant path and also reduces duct resistance at a non-lockup time when the oil temperature is low. Oil is provided to an oil cooler for cooling the oil, and is also provided to the automatic transmission for lubricating the transmission. The device includes a switching valve that is switched between a lockup state and a non-lockup state of the clutch. In the lockup state, the switching valve is switched to a first position at which a first input pressure is supplied to the starter and a second input pressure is supplied through the oil cooler to the transmission. In the non-lockup state, the switching valve is switched to a second position at which the first input pressure is discharged through the starter and the oil cooler to an oil pan, and the second input pressure is supplied to the transmission.

4 Claims, 1 Drawing Sheet

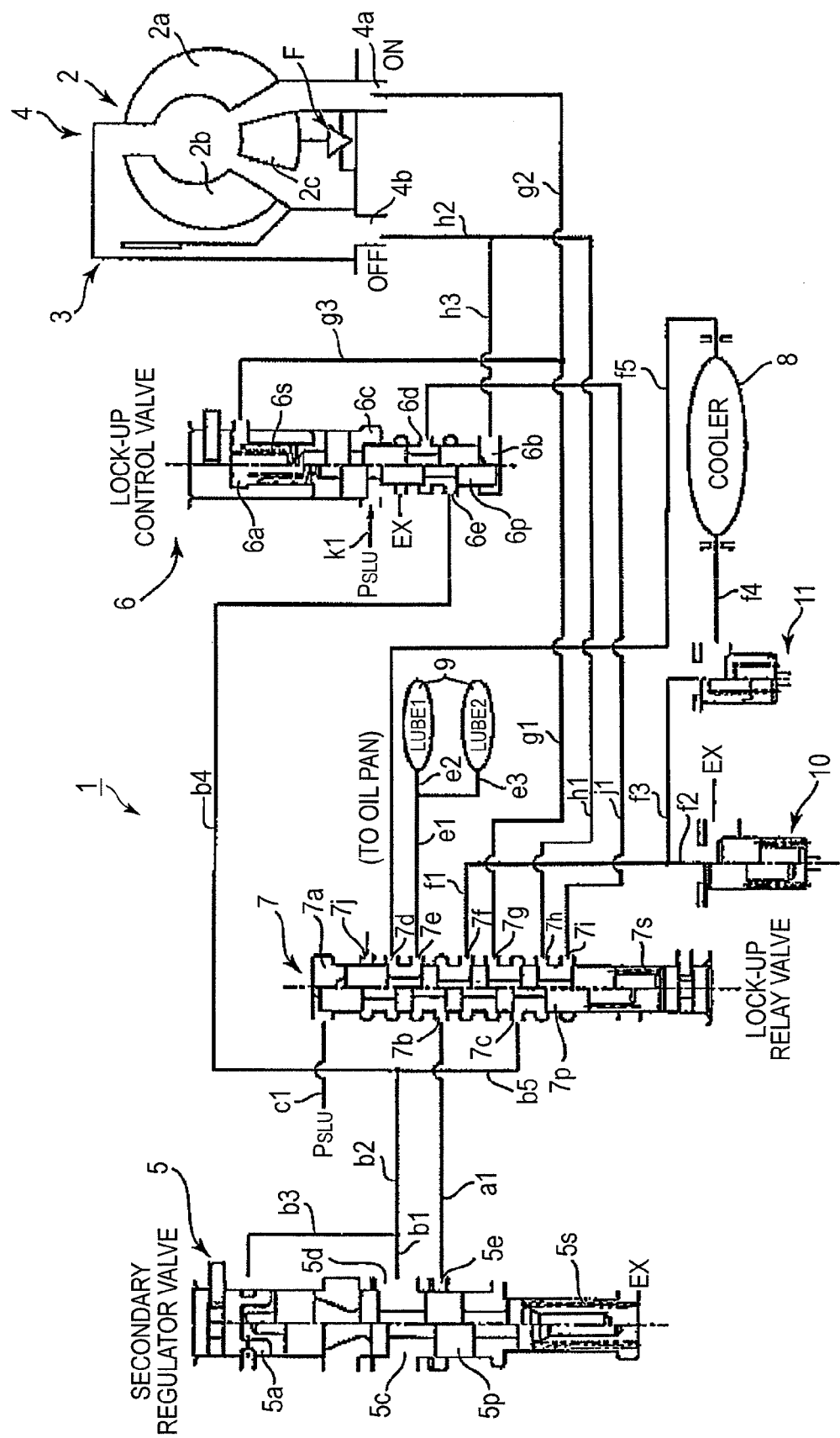

HYDRAULIC CONTROL DEVICE FOR AUTOMATIC TRANSMISSION

INCORPORATION BY REFERENCE

This application claims priority from Japanese Patent Application No. 2009-059622, filed on Mar. 12, 2009, the disclosure of which, including the specification, drawing and abstract, is incorporated herein by reference in its entirety.

BACKGROUND OF THE INVENTION

1. Field of the Invention

The present invention relates to a hydraulic control device for an automatic transmission mounted in a vehicle or the like, and particularly to a hydraulic control device for an automatic transmission by which oil is supplied into or discharged from a starting device having a hydraulic power transmission and a clutch that can lock up the hydraulic power transmission, oil is fed out to an oil cooler to cool the oil, and oil is supplied into an automatic transmission mechanism to lubricate the automatic transmission mechanism.

2. Description of the Related Art

An automatic transmission mounted in a vehicle or the like is equipped with a starter for transmitting the output of a driving source to the input shaft of a transmission mechanism, that is, the starter is provided with a torque converter that can permit the difference in rotational number between the output shaft (crank shaft) of an engine and the input shaft of the transmission mechanism by performing hydraulic power transmission. Furthermore, some starters of automatic transmissions as described above are equipped with lockup clutches that can set (lock up) the output shaft of the engine and the input shaft of the transmission mechanism to a direct coupling state to improve fuel-efficiency or the like.

In general, a hydraulic circuit of an automatic transmission having a torque converter as described above is constructed so that oil discharged from the starter is supplied to an oil cooler to cool oil whose temperature is increased in the torque converter when the lockup clutch is released, and also constructed so that oil is supplied through the oil cooler into a lubricant path of the transmission mechanism to improve the cooling property of the respective parts of the transmission mechanism (for example, see JP-A-8-135772 (Patent Document 1)).

There is a case where minute foreign materials occur in the torque converter of the automatic transmission when it is manufactured, and thus a step of removing these foreign materials is provided in the manufacturing process. However, the foreign materials cannot be perfectly removed even when the process is passed through the foreign material removing step. Accordingly, when the lubricant path is constructed in series with the torque converter as in the case of the Patent Document 1, these foreign materials invade into the lubricant path, which causes abrasion of the respective parts of the transmission mechanism.

Furthermore, with respect to the hydraulic circuit in which the torque converter, the oil cooler and the lubricant path are arranged in series as in the case of the Patent Document 1, for example under a low oil temperature state immediately after the engine is started or the like, the viscosity of the oil is high and the duct resistance is large. Accordingly, there is a problem that the lubricant to be supplied to the respective parts of the transmission mechanism runs short, supply of oil into an oil chamber for canceling centrifugal hydraulic pressure of the clutch arranged in the transmission mechanism is delayed or the like.

SUMMARY OF THE INVENTION

Therefore, the present invention has an object to provide a hydraulic control device for an automatic transmission that can prevent flow-in of foreign materials from a starter into a lubricant path and also reduce duct resistance at a non-lockup time when the oil temperature is low.

According to a first aspect of this invention (for example, see FIG. 1), the present invention provides a hydraulic control device for an automatic transmission by which oil is supplied to and discharged from a starter having a hydraulic power transmission interposed between a driving source and an automatic transmission mechanism and a clutch capable of locking up the hydraulic power transmission, oil is fed out to an oil cooler to cool the oil concerned and oil is supplied into the automatic transmission mechanism to lubricate the automatic transmission mechanism, the device comprising a lockup switching valve that is switched on a lockup state and a non-lockup state of the clutch, wherein under the lockup state the lockup switching valve is switched to a first position (right half position) at which an input first input pressure is supplied to the starter and also an input second input pressure is supplied through the oil cooler to the automatic transmission mechanism, and under the non-lockup state the lockup switching valve is switched to a second position (left half position) at which the first input pressure is discharged through the starter and the oil cooler to an oil pan and also the second input pressure is supplied to the automatic transmission mechanism.

Specifically, in a second aspect of the present invention (for example, see FIG. 1), the starter has two ports of a first supply/discharge port for receiving oil under the lockup state and outputting oil under the non-lockup state, and a second supply/discharge port for receiving oil under the non-lockup state and outputting oil under the lockup state, and the lockup switching valve reversely switches the supply/discharge to/from the first supply/discharge port and the second supply/discharge port by switching the first position (right half position) and the second position (left half position) to each other.

More specifically, in a third aspect of the present invention (for example, see FIG. 1), the lockup switching valve has a first port for receiving the first input pressure, a second port for receiving the second input pressure, a third port connected to the first supply/discharge port, a fourth port connected to the second supply/discharge port, a fifth port connected to an input oil path of the oil cooler, a sixth port connected to an output oil path of the oil cooler, a seventh port connected to the automatic transmission mechanism and an eight port intercommunicating with the oil pan; the first port and the third port, the second port and the fifth port and the sixth port and the seventh port respectively intercommunicate with each other at the first position (right half position); and the first port and the fourth port, the third port and the fifth port, the sixth port and the eighth port and the second port and the seventh port respectively intercommunicate with each other at the second position (left half position).

Furthermore, specifically, in a fourth aspect of the present invention (for example, see FIG. 1), the device further comprises a lockup pressure control valve for controlling a negative pressure for setting engagement force of the clutch under the lockup state, wherein the lockup switching valve has a ninth port connected to the lockup pressure control valve, and the fourth port and the ninth port intercommunicate with each other at the first position (right half position).

According to the first aspect of the invention, there is provided the lockup switching valve for supplying the first input pressure to the starter and supplying the second input pressure through the oil cooler to the automatic transmission mechanism under the lockup state, and also discharging the first input pressure through the starter and the oil cooler to the oil pan and also supplying the second input pressure to the automatic transmission mechanism under the non-lockup state. Therefore, under both the lockup state and the non-lockup state, the starter and the automatic transmission mechanism are prevented from being disposed in series and constructing the oil path in which oil flows, and even when foreign material remains in the starter, the foreign material can be prevented from flowing into the lubricant path of the automatic transmission mechanism.

Under the non-lockup state at a low temperature, oil is supplied to the automatic transmission mechanism without passing through the oil cooler having a large duct resistance. Therefore, the duct resistance can be reduced, lack of lubricant to be supplied to the respective parts of the automatic transmission mechanism, and delay of supply of oil to the oil chamber to cancel centrifugal oil pressure of the clutch disposed in the automatic transmission mechanism can be prevented.

Furthermore, under the lockup state, oil is supplied to the lubricant path of the automatic transmission mechanism through the oil cooler, and under the non-lockup state, oil discharged from the starter is supplied to the oil cooler. Therefore, in the lockup state under which the vehicle speed increases and thus the automatic transmission mechanism is apt to be required to be cooled, oil cooled through the oil cooler can be supplied to the lubricant path. In the non-lockup state under which oil whose temperature is increased in the hydraulic power transmission is required to be cooled, oil discharged from the starter can be immediately supplied to the oil cooler.

According to the second aspect of the invention, there is provided the lockup switching valve for reversely switching the supply/discharge to/from the first supply/discharge port and the second supply/discharge port by switching the first position and the second position to each other. Therefore, in the case of provision of the starter having two ports of the first supply/discharge port for receiving oil under the lockup state and outputting oil under the non-lockup state and the second supply/discharge port for receiving oil under the non-lockup state and outputting oil under the lockup state, foreign materials can be prevented from flowing into the lubricant path of the automatic transmission mechanism.

According to the third aspect of the invention, under the lockup state, the lockup switching valve is switched to the first position, and oil is supplied to the lubricant path of the automatic transmission mechanism through the oil cooler. Under the non-lockup state, the lockup switching valve is switched to the second position, and oil discharged from the starter can be supplied to the oil cooler.

According to the fourth aspect of the invention, the lockup switching valve has a ninth port connected to the lockup pressure control valve, and the fourth port and the ninth port intercommunicate with each other at the first position. Therefore, the negative voltage for setting the engagement force of the clutch can be controlled by the lockup pressure control valve under the lockup state.

BRIEF DESCRIPTION OF THE DRAWINGS

FIG. 1 is a circuit diagram showing a hydraulic control device according to an embodiment.

DETAILED DESCRIPTION OF THE EMBODIMENTS

An embodiment according to the present invention will be described hereunder with reference to FIG. 1.

For example, an automatic transmission (overall view is omitted) mounted in a vehicle or the like is equipped with an input shaft connectable to a crank shaft of an engine (driving source), a starter 4 for rotation (driving force) of the input shaft, and an automatic transmission mechanism 9 for changing the speed of the rotation input through the starter 4 by a gear mechanism or a friction engaging element (clutch or brake) and transmitting it to an output shaft, and further equipped with a hydraulic control device 1 for an automatic transmission according to the present invention so that the engagement state of the friction engaging element of the automatic transmission mechanism 9 and the starter may be hydraulically controlled.

As shown in FIG. 1, the starter 4 has a torque converter (hydraulic power transmission) 2 comprising a pump impeller 2a to which the rotation of the input shaft is input, a turbine runner 2b which receives flow of oil from the pump impeller 2a and rotates (power is hydraulically transmitted) and a stator 2c for generating a torque increasing effect while rectifying oil returned from the turbine runner 2b to the pump impeller 2a. Furthermore, it is equipped with a lockup clutch (clutch) 3 for directly coupling the input shaft and the turbine runner 2b on the basis of oil supply described later in detail. The stator 2c is configured so as to be fixed in rotation by a one-way clutch F under the state that the rotation of the turbine runner 2b is lower than the rotation of the pump impeller 2a, generate the torque increasing effect by receiving reactive force of the flow of oil and run idle when the rotation of the turbine runner 2b exceeds the rotation of the pump impeller 2a, whereby the flow of oil is prevented from acting in the negative direction.

Furthermore, the starter 4 is provided with a supply/discharge port (first supply/discharge port) 4a to which oil is input when the lockup clutch 3 is under a lockup state and also from which oil is output when the lockup clutch 3 is under a lockup release state, and a supply/discharge port (second supply/discharge port) 4b to which oil is input under the lockup release state and from which oil is output under the lockup state.

Next, the hydraulic control device 1 of the automatic transmission according to the present invention will be described. As shown in FIG. 1, the hydraulic control device 1 for the automatic transmission has a linear solenoid valve SLU (not shown), a secondary regulator valve 5, a lockup relay valve (lockup change-over valve) 7, a lockup control valve (lockup pressure control valve) 6, a check valve 10, a check valve 11, an oil cooler 8, a lubricant path (automatic transmission mechanism) (LUBE) 9 for lubricating a gear mechanism, etc. in the automatic transmission mechanism, etc.

In addition to the parts shown in FIG. 1, the hydraulic control device 1 for the automatic transmission is provided with various kinds of valves, oil paths, etc. for supplying oil pressure to the clutch of the automatic transmission mechanism and the hydraulic servo of the brake, however, the description thereof, excluding main parts of the present invention, is omitted for the convenience of description.

As shown in FIG. 1, the hydraulic control device 1 for the automatic transmission is provided with an oil pump (not shown) which is driven interlockingly with the rotation of the engine (the opening degree of the throttle), and the oil pressure generated by the oil pump is adjusted to a line pressure $P_L$ by a primary regulator valve (not shown). The linear solenoid valve SLU adjusts the line pressure $P_L$ to the control pressure $P_{SLU}$ corresponding to the running condition of the vehicles on the basis of a signal from an electronic control device (not shown) and outputs the control pressure $P_{SLU}$.

The secondary regulator valve 5 has a spool 5p, and a spring 5s for urging the spool 5p to the upper side, and also has an oil chamber 5a, an input port 5c, an output port 5d and an output port 5e at the upper side of the spool 5p. Furthermore, a secondary pressure $P_{SECA}$ described later in detail is input as a feedback pressure into the oil chamber 5a.

When the position of the spool 5p of the secondary regulator valve 5 is under a state at the right side of FIG. 1 (hereinafter referred to as "right half position"), the input port 5c and the output port 5d intercommunicate with each other, and when the movement of the spool 5p is controlled to a state at the left side of FIG. 1 against the urging force of the spring 5s (hereinafter referred to as "left half position"), the input port 5c and the output port 5e intercommunicate with each other (the throttle amount is reduced). That is, the movement of the spool 5p is controlled by the magnitude of the feedback pressure output from the output port 5d and input through the oil paths b1 and b3 into the oil chamber 5a (that is, the oil pressure output from the primary regulator valve and input to the input port 5c), and also the oil pressure output from the output port 5d is adjusted by adjusting the oil pressure amount discharged from the output port 5e, whereby the oil pressures of the oil paths b1, b2, b3, b4 and b5 are adjusted as the secondary pressure (first input pressure) $P_{SECA}$ corresponding to the opening degree of the throttle.

Furthermore, the oil pressure discharged from the output port 5e into the oil path a1 is supplied as an exhaust pressure (second input pressure) $P_{SECB}$ exhausted from the secondary regulator valve 5 through the oil path a1 to the port 7b of the lockup relay valve 7 described later in detail.

The lockup relay valve 7 has a spool 7p and a spring 7s for urging the spool 7p to the upper side, and also has an oil chamber 7a, a port (second port) 7b, a port (first port) 7c, a port (sixth port) 7d, a port (seventh port) 7e, a port (fifth port) 7f, a port (third port) 7g, a port (fourth port) 7h, a port (ninth port) 7i and a port (eighth port) 7j at the upper side of the spool 7p.

The linear solenoid valve SLU is connected to the oil chamber 7a through an oil path c1, and when the control pressure $P_{SLU}$ is output from the linear solenoid valve SLU, the control pressure $P_{SLU}$ is input. That is, the lockup relay valve 7 is located at the left half position (second position) under the state that no control pressure $P_{SLU}$ is output from the linear solenoid valve SLU or under the state that the control pressure $P_{SLU}$ is lower than a predetermined pressure, and it is located at the right half position (first position) under the state that the control pressure $P_{SLU}$ output from the linear solenoid valve SLU is higher than a predetermined pressure.

When the spool 7p of the lockup relay valve 7 is located at the left half position, the port 7b and the port 7e, the port 7c and the port 7h, the port 7f and the port 7g, and the port 7d and the port 7j are respectively set to intercommunicate with each other. When the spool 7p is located at the right half position, the port 7b and the port 7f, the port 7c and the port 7g, the port 7d and the port 7e and the port 7h and the port 7i are respectively set to intercommunicate with each other.

Under the state that no control pressure $P_{SLU}$ is output from the linear solenoid valve SLU or under the state that the control pressure $P_{SLU}$ is lower than the predetermined pressure, no oil pressure is input to the oil chamber 7a or a pressure lower than the predetermined pressure is input, and the spool 7p is located at the left half position by the urging force of the spring 7s. At this time, the exhaust pressure $P_{SECB}$ of the secondary pressure input through the oil path a1 into the port 7b is output from the port 7e, and supplied through oil paths e1, e2 and e3 into the lubricant path 9 of the automatic transmission mechanism.

The secondary pressure $P_{SECA}$ input through the oil paths b1, b2, b5 is output from the port 7h, and supplied to the supply/discharge port 4b of the starter 4 through oil paths h1 and h2, that is, the secondary pressure $P_{SECA}$ is supplied into the starter 4, whereby the starter 4 is set to the lockup release state. The oil supplied into the starter 4 is output from the supply/discharge port 4a, input through oil paths g2 and g1 into the port 7g of the lockup relay valve 7, further output from the port 7f, and input to the oil cooler (COOLER) 8 through the oil paths f1, f3, f4, etc. After the oil input into the oil cooler 8 is cooled by the oil cooler 8, the oil is input through an oil path f5 into the port 7d of the lockup relay valve 7, further output from the port 7j and discharged to an oil pan (not shown). The check valve 10 is disposed through the oil path f2 in the section of the oil paths f1, f3, f4, and the check valve 11 is disposed between the oil paths f3 and f4, and the oil pressure supplied to the oil cooler 8 is adjusted to be kept in a fixed range.

Under the state that the control pressure $P_{SLU}$ from the linear solenoid valve SLU is higher than the predetermined pressure, the control pressure $P_{SLU}$ is input into the oil chamber 7a, and the spool 7p is located at the right half position against the urging force of the spring 7s. At this time, the exhaust pressure $P_{SECB}$ of the secondary pressure input through the oil path a1 into the port 7b is output from the port 7f, and input into the oil cooler 8 through the oil paths f1, f3, f4, etc. After the oil input into the oil cooler 8 is cooled by the oil cooler 8, the oil is input into the port 7d of the lockup relay valve 7 through the oil path f5, further output from the port 7e, and supplied into the lubricant path 9 of the automatic transmission mechanism through the oil paths e1, e2, e3.

Furthermore, the secondary pressure $P_{SECA}$ input into the port 7c through the oil paths b1, b2, b5 is output from the port 7g, and supplied to the supply/discharge port 4a of the starter 4 through the oil paths g1, g2, that is, the secondary pressure $P_{SECA}$ is supplied into the starter 4, whereby the starter 4 is set to the lockup state. The oil supplied into the starter 4 is output from the supply/discharge port 4b, input through the oil paths h2, h1 into the port 7h of the lockup relay valve 7, further output from the port 7i, and input through an oil j1 into the port 6d of the lockup control valve 6 described later in detail.

The lockup control valve 6 has a spool 6p and a spring 6s for urging the spool 6p to the lower side, and also it has a oil chamber 6b at the lower side of the spool 6p, an oil chamber 6a at the upper side of the spool 6p, an oil chamber 6c formed by the difference in diameter of the land portion of the spool 6p (the difference of the pressure receiving area), a port 6d and a port 6e.

As described above, when the lockup relay valve 7 is located at the left half position (that is, the lockup release state), the secondary pressure $P_{SECA}$ output from the port 7h of the lockup relay valve 7 is input through the oil paths h1, h3 into the oil chamber 6b of the lockup control valve 6, and the control pressure $P_{SLU}$ based on a signal from the electronic control device is input from the linear solenoid valve SLU (not shown) through the oil path k1 into the oil chamber 6c.

Furthermore, the oil pressure output from the supply/discharge port 4a of the starter 4 is input through the oil paths g2, g3 into the oil chamber 6a.

The lockup control valve 6 is set to the state that no control pressure $P_{SLU}$ is output from the linear solenoid valve SLU or the control pressure $P_{SLU}$ is lower than the predetermined pressure as described above, and thus the oil pressure acting on the oil chamber 6a and the urging force of the spring 6s exceed, so that the spool 6p is located at the left half position. When the spool 6p of the lockup control valve 6 is located at the left half position, the port 6d and the port 6e intercommunicate with each other. However, the port 7i of the lockup relay valve 7 which is connected to the port 6d through the oil path j1 is set to an interruption state, so that no oil pressure acts.

On the other hand, when the lockup relay valve 7 is located at the right half position (that is, the lockup state) as described above, the oil pressure output from the supply/discharge port 4b of the starter 4 is input through the oil paths h2 and h3 into the oil chamber 6b of the lockup control valve 6, and the control pressure $P_{SLU}$ based on a signal from the electronic control device is input from the linear solenoid valve SLU (not shown) through an oil path k1 into the oil chamber 6c. The secondary pressure $P_{SECA}$ output from the port 7g of the lockup relay valve 7 is input through the oil paths g1 and g3 into the oil chamber 6a.

When the control pressure $P_{SLU}$ is input into the oil chamber 6c under the state that it is set to be higher than the predetermined pressure, the spool 6p of the lockup control valve 6 is controlled to move to the upper side (from the left half position to the right half position in the FIGURE) against the oil pressure acting on the oil chamber 6a and the urging force of the spring 6s. At this time, the port 6d and the drain port EX gradually intercommunicate with each other (the throttle amount is reduced) as the spool 6p moves upwardly), and the oil pressure of the oil chamber 6b is reduced through the oil path j1, the ports 7i, 7h of the lockup relay valve 7 and the oil paths h1 and h3. That is, the movement of the spool 6p is controlled by the magnitude of the control pressure $P_{SLU}$ input through the oil path k1 into the oil chamber 6c (that is, the oil pressure corresponding to the running condition of the wheels), and also the oil pressure amount exhausted from the drain port EX is adjusted, whereby the oil pressures of the ports 7i, 7h of the lockup relay valve 7 and the oil paths h1, h2 and h3, that is, a negative pressure for setting the engagement force of the lockup state of the lockup clutch 3 is controlled.

As described above, the hydraulic control device 1 for the automatic transmission according to the embodiment of the present invention is provided with the lockup relay valve 7 by which under the lockup state the secondary pressure $P_{SECA}$ is supplied to the starter 4 and also the exhaust pressure $P_{SECB}$ of the secondary pressure is supplied through the oil cooler 8 into the lubricant path 9 of the automatic transmission mechanism, and under the lockup release state, the secondary pressure $P_{SECA}$ is discharged into the oil pan through the starter 4 and the oil cooler 8 and also the exhaust pressure $P_{SECB}$ of the secondary pressure is supplied to the lubricant path 9 of the automatic transmission mechanism. Therefore, both under the lockup state and the lockup release state, the starter 4 and the lubricant path 9 of the automatic transmission mechanism are avoided from being disposed in series and thus constructing an oil path through which oil flows. Accordingly, even when foreign material remains in the starter 4, the foreign material can be prevented from flowing into the lubricant path 9 of the automatic transmission mechanism.

Under the lockup release state at a low oil temperature, oil is supplied to the lubricant path 9 of the automatic transmission mechanism without passing through the oil cooler 8 having large duct resistance, and thus the duct resistance can be reduced, so that lack of supply of lubricant to each part of the automatic transmission mechanism and delay of supply of oil to the oil chamber to cancel centrifugal oil pressure of the clutch disposed in the automatic transmission mechanism can be prevented.

Furthermore, under the lockup state, oil is supplied through the oil cooler 8 into the lubricant path 9 of the automatic transmission mechanism, and under the lockup release state, oil discharged from the starter 4 is supplied into the oil cooler 8. Therefore, in the lockup state under which the vehicle speed increases and thus the lubricant path 9 of the automatic transmission mechanism is apt to be required to be cooled, oil cooled through the oil cooler 8 can be supplied to the lubricant path 9. In the lockup release state under which oil whose temperature is increased in the torque converter 2 is required to be cooled, oil discharged from the starter 4 can be immediately supplied to the oil cooler 8.

Furthermore, there is provided the lockup relay valve 7 which reversely switches the supply/discharge to/from the supply/discharge port 4a and the supply/discharge port 4b by switching the lockup relay valve 7 between the left half position and the right half position. Therefore, in the case of provision of the starter 4 having two ports of the supply/discharge port 4a for receiving oil under the lockup state and outputting oil under the lockup release state and the supply/discharge port 4b for receiving oil under the lockup release state and outputting oil under the lockup state, foreign materials can be prevented from flowing into the lubricant path 9 of the automatic transmission mechanism.

Furthermore, oil can be supplied through the oil cooler 8 into the lubricant path 9 of the automatic transmission mechanism by switching the lockup relay valve 7 to the right half position under the lockup state, and also oil discharged from the starter 4 can be supplied to the oil cooler 8 by switching the lockup relay valve 7 to the left half position under the lockup release state.

Furthermore, the lockup relay valve 7 has the port 7i connected to the lockup control valve 6, and the port 7h and the port 7i intercommunicate with each other at the right half position. Therefore, the negative pressure for setting the engagement force of the lockup clutch 3 can be controlled by the lockup control valve 6 under the lockup state.

In this embodiment, the first input pressure and the second input pressure are described as the secondary pressure and the exhaust pressure of the secondary pressure, respectively. However, the present invention is not limited to this style, and the invention may be applied by using the line pressure and the exhaust pressure of the line pressure, for example.

The hydraulic control device for the automatic transmission according to this invention can be applied to an automatic transmission mounted in a passenger car, a truck or the like, and particularly it is suitably applied to an automatic transmission which is required to prevent flow-in of foreign material from the starter into the lubricant path and also reduce the duct resistance under the non-lockup state at low temperature.

What is claimed is:

1. A hydraulic control device for an automatic transmission by which oil is supplied to and discharged from a starter having a hydraulic power transmission interposed between a driving source and an automatic transmission mechanism and a clutch capable of locking up the hydraulic power transmission, oil is fed out to an oil cooler to cool the oil concerned and oil is supplied into the automatic transmission mechanism to lubricate the automatic transmission mechanism, the device comprising:

a lockup switching valve that is switched on a lockup state and a non-lockup state of the clutch, the lockup switching valve having a first input pressure and a second input pressure input thereto, wherein under the lockup state the lockup switching valve is switched to a first position at which the first input pressure is supplied to the starter and the second input pressure is supplied through the oil cooler to the automatic transmission mechanism, and under the non-lockup state the lockup switching valve is switched to a second position at which the first input pressure is discharged through the starter and the oil cooler to an oil pan and also the second input pressure is supplied to the automatic transmission mechanism.

2. The hydraulic control device for the automatic transmission according to claim 1, wherein the starter has two ports of a first supply/discharge port for receiving oil under the lockup state and outputting oil under the non-lockup state, and a second supply/discharge port for receiving oil under the non-lockup state and outputting oil under the lockup state, and the lockup switching valve reversely switches the supply/discharge to/from the first supply/discharge port and the second supply/discharge port by switching the first position and the second position to each other.

3. The hydraulic control device for the automatic transmission according to claim 2, wherein the lockup switching valve has a first port for receiving the first input pressure, a second port for receiving the second input pressure, a third port connected to the first supply/discharge port, a fourth port connected to the second supply/discharge port, a fifth port connected to an input oil path of the oil cooler, a sixth port connected to an output oil path of the oil cooler, a seventh port connected to the automatic transmission mechanism and an eight port intercommunicating with the oil pan; the first port and the third port, the second port and the fifth port and the sixth port and the seventh port respectively intercommunicate with each other at the first position; and the first port and the fourth port, the third port and the fifth port, the sixth port and the eighth port and the second port and the seventh port respectively intercommunicate with each other at the second position.

4. The hydraulic control device for the automatic transmission according to claim 3, further comprising a lockup pressure control valve for controlling a negative pressure for setting engagement force of the clutch under the lockup state, wherein the lockup switching valve has a ninth port connected to the lockup pressure control valve, and the fourth port and the ninth port intercommunicate with each other at the first position.

* * * * *